(No Model.)
J. R. HARE.
PATCH FOR PNEUMATIC TIRES.
No. 603,846. Patented May 10, 1898.
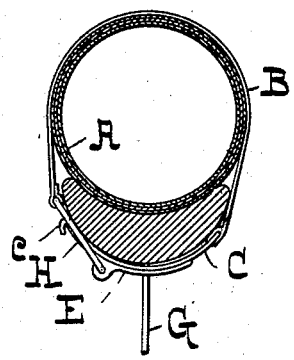
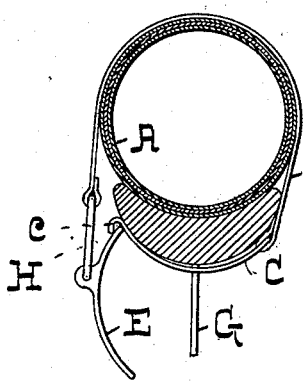
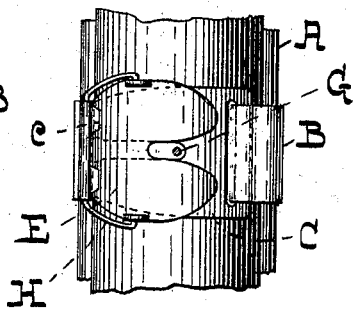
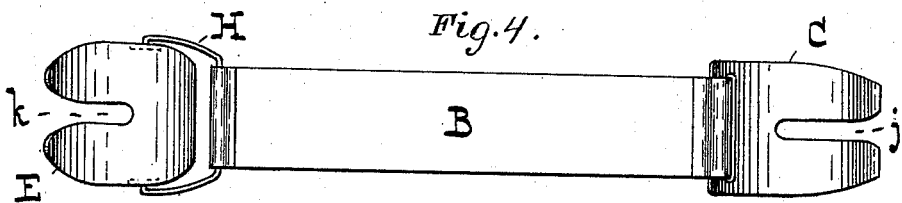
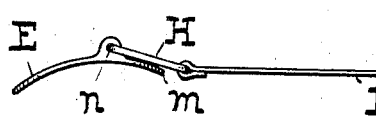
—WITNESSES—
Dan'l Fisher
H. Constantine
—INVENTOR—
John R. Hare,
by Geo. W. T. Howard,
atty.

UNITED STATES PATENT OFFICE.

JOHN R. HARE, OF BALTIMORE, MARYLAND.

PATCH FOR PNEUMATIC TIRES.

SPECIFICATION forming part of Letters Patent No. 603,846, dated May 10, 1898.

Application filed June 10, 1897. Serial No. 640,192. (No model.)

*To all whom it may concern:*

Be it known that I, JOHN R. HARE, of the city of Baltimore, State of Maryland, have invented certain Improvements in Patches for Pneumatic Tires of Vehicles, of which the following is a specification.

In the description of the said invention which follows reference is made to the accompanying drawings, forming a part thereof, and in which—

Figure 1 is a cross-section of the tire, showing the invention as applied thereto. Fig. 2 is an under side view of Fig. 1. Fig. 3 is a view similar to Fig. 1, except that the device is shown as not fully locked on the pneumatic tire. Fig. 4 is an under side view of the device when extended. Fig. 5 is an edge view of Fig. 4.

Referring now to the drawings, A represents a pneumatic tire of a bicycle.

B is a band of some soft pliable waterproof material, such as webbing coated with rubber. At one end of this band is secured a plate C, which forms one member of a locking device whereby the ends of the bands are drawn together and secured. This plate is straight in the direction of its width and in the other direction has a curvature which is about the same as that of the exterior surface of the rim of the wheel. The end of the flexible band B is passed through a transverse slot in the plate C and folded on itself, as shown particularly in Fig. 5. The plate C has a longitudinally-extending slot $j$, and the ends of the two parts of the plate which are formed by slotting the same are turned up to form hooks $c$. The other member of the locking device consists of a plate E, which is straight in the direction of its width and curved in the direction of its length, like the one C, and it has a slot $k$, similar to the one $j$ in the plate C, so that when the two plates are brought together and made one to overlap the other the slots $j$ and $k$ will register and leave a space for the spoke G of the wheel, as shown in Fig. 2. The plate E is connected to the flexible band B by means of a staple H, the ends of which are hinged to lugs on the outside of the plate.

To apply the patch to a punctured bicycle-tire, the band is placed over the puncture in the tire and the end $m$ of the plate E inserted in the hooks $c$ of the plate C, as shown in Fig. 3. The locking is completed by forcing down the plate E until the pivotal point $n$ has passed the straight portion of the band, when the said plate will spring into contact with the plate C.

I claim as my invention—

In a hose-patch, a flexible band having at one end a curved plate with hooks at its extremity, and at the other end a link, and a curved plate with lugs to which the said link is pivoted, the inner end of the second plate being adapted to engage with the hooks on the first, whereby the second plate is made to perform the function of a lever in the application of the device to a hose, substantially as specified.

JOHN R. HARE.

Witnesses:
 WM. T. HOWARD,
 DANL. FISHER.